United States Patent
Candy

(10) Patent No.: US 8,106,770 B2
(45) Date of Patent: *Jan. 31, 2012

(54) METAL DETECTOR WITH IMPROVED MAGNETIC SOIL RESPONSE CANCELLATION

(75) Inventor: Bruce Halcro Candy, Adelaide (AU)

(73) Assignee: Minelab Electronics Pty Ltd, Torrensville (AU)

( * ) Notice: Subject to any disclaimer, the term of this patent is extended or adjusted under 35 U.S.C. 154(b) by 298 days.

This patent is subject to a terminal disclaimer.

(21) Appl. No.: 12/442,371

(22) PCT Filed: Oct. 5, 2007

(86) PCT No.: PCT/AU2007/001507
§ 371 (c)(1),
(2), (4) Date: Mar. 20, 2009

(87) PCT Pub. No.: WO2008/040089
PCT Pub. Date: Apr. 10, 2008

(65) Prior Publication Data
US 2010/0026485 A1 Feb. 4, 2010

(30) Foreign Application Priority Data
Oct. 5, 2006 (AU) ................................ 2006905485

(51) Int. Cl.
*G08B 13/24* (2006.01)
(52) U.S. Cl. ................ 340/551; 340/636.15; 340/644
(58) Field of Classification Search ............... 340/551, 340/550, 552, 553, 555, 557, 567, 561, 636.15, 340/636.12, 644–645
See application file for complete search history.

(56) References Cited

U.S. PATENT DOCUMENTS

| 4,942,360 A * | 7/1990 | Candy ................ 324/329 |
| 5,537,041 A | 7/1996 | Candy |
| 5,576,624 A | 11/1996 | Candy |
| 6,636,044 B2 | 10/2003 | Candy |
| 6,653,838 B2 * | 11/2003 | Candy ................ 324/329 |
| 7,652,477 B2 * | 1/2010 | Candy ................ 324/326 |

FOREIGN PATENT DOCUMENTS

| AU | 198943504 | 4/1990 |
| AU | 632320 | 12/1992 |
| AU | 2006903737 | 7/2006 |
| WO | WO 87/04801 | 8/1987 |
| WO | WO 2005/047932 | 5/2005 |
| WO | WO 2008/006178 | 1/2008 |

\* cited by examiner

*Primary Examiner* — Daniel Previl
(74) *Attorney, Agent, or Firm* — Beyer Law Group LLP

(57) ABSTRACT

A method for detecting a target in a soil, including the step of generating a transmit signal, the transmit signal including at least three different frequency components, a relatively high frequency component, a relatively medium frequency component and a relatively low frequency component; and processing a receive signal, the processing including selecting coefficients for, in effect, linearly combining the relatively high frequency components, the relatively low frequency components and the relatively medium frequency components of the receive signal to produce an indicator output signal, the indicator output signal including a signal indicative of the presence of the target in the soil, and wherein the coefficients are selected such that the indicator output signal is approximately independent of log-linear frequency-dependent resistive signal components and log-uniform resistive signal components from the soil.

20 Claims, 2 Drawing Sheets

METAL DETECTOR WITH IMPROVED MAGNETIC SOIL RESPONSE CANCELLATION

TECHNICAL FIELD

This disclosure relates to metal detectors which are relatively insensitive to the interrogation of magnetic soils whose magnetic permeable resistive component is mostly frequency independent, but also includes at least a higher order effect of relatively small frequency dependence, in particular, small variations in a ratio of received relatively high frequency resistive components compared to lower frequency resistive components.

BACKGROUND ART

In this specification unless the contrary is expressly stated, where a document, act or item of knowledge is referred to or discussed, this reference or discussion is not to be construed as an admission that the document, act or item of knowledge or any combination thereof was at the priority date, publicly available, known to the public, part of common general knowledge; or known to be, relevant to an attempt to solve any problem with which this specification is concerned.

The general forms of most metal detectors that interrogate soils are one of handheld battery-operated units, conveyor-mounted units, or vehicle-mounted units. Examples of handheld products include detectors used to locate gold, explosive land mines or ordnance, coins and treasure. Examples of conveyor-mounted units include fine gold detectors in ore mining operations, and an example of a vehicle-mounted unit includes a unit to search for land mines.

These metal detectors usually consists of a at least one or more inductors which may transmit and receive an alternating magnetic field, such inductors often referred to as "coils," transmit electronics which may generate a transmit signal applied to at least one inductor to produce a transmitted magnetic field, at least one inductor, a first inductor, receives a magnetic field to produce a receive emf signal, the said first inductor is connected to receive electronics which may amplify and filter the receive emf signal to produce a receive signal, the receive electronics contains signal processing which may process the receive signal to produce and output indicator signal.

Magnetic soils produce relatively large interfering signals compared to typical targets sought, for example gold or landmines buried relatively deeply. To detect such targets in magnetic soils, it is necessary for the transmitted magnetic field to contain multi-frequencies and the receive signal to be processed in such a way that linear combinations of the multi-frequencies cancel out the signals from the magnetic soils whilst not canceling target signals.

Most metal detectors transmit a repeating sequence. Examples of multi-frequency metal detectors with the ability to substantially reduce magnetic soil signals are disclosed in:

1) U.S. Pat. Nos. 5,576,624, 6,636,044, 6,653,838; a pulse induction transmit waveform "time domain" detector. Receive signal relatively high frequency resistive components are most strongly manifest following immediately after the very short high back emf. This period following the back emf is a receive period, a first period, during which the transmitted magnetic field is zero. Mostly only relatively low frequency resistive components are manifest in the receive signal near the end of the first period before the transmitted magnetic field turns "on" again, and mostly relatively medium frequency resistive components (and low-frequency resistive components) are manifest during periods between the above periods within the first period.
2) U.S. Pat. No. 4,942,360 describes a multi-frequency system for which the transmit signal may be any form, but as an example, sine-waves are suggested.
3) U.S. Pat. No. 5,537,041, WO 2005/047932 describes a multi-period rectangular-wave transmitting metal detector.
4) Australian application 2006903737 describes a pulse-induction-like transmission but with a finite constant transmitted magnetic field during the receiving period. In terms of receive frequency resistive components, this is similar in response to the pulse induction system described above.

Whilst all of the above describe means to cancel soils with resistive components independent of frequency, they do not describe means to cancel higher order effects for soils with very small but significant variations in resistive components not being quite independent of frequency, including the resistive frequency spectrum being slightly dependent on the magnitude of the transmitted magnetic field. This said soil resistive component frequency dependence limits the detection depth in some high magnetic permeable soils in the art described above.

The inventor has contrived a means to address this problem and thus increase detection depth in such soils.

Other objects and advantages of the present invention will become apparent from the following description, taken in connection with the accompanying drawings, wherein, by way of illustration and example, an embodiment of the present invention is disclosed.

DISCLOSURE OF THE INVENTION

A transmitted magnetic field must contain at least three different frequency components, a relatively high frequency component, a relatively low frequency component and a relatively medium frequency component, including a transmitted magnetic field spectrum which may be continuous or discrete, the receive electronics contains signal processing which may process the receive signal to produce and output indicator signal, such that at least part of the signal processing includes at least one linear combination of, in effect, adding receive signal components containing at feast relatively high frequency resistive components to receive signal components containing at least relatively low frequency resistive components and the resultant sum is subtracted from receive signal components containing at least relatively medium frequency resistive components to give a linear combination output, coefficients of the linear combination being selected so that the linear combination output is approximately independent of signals from magnetic soils including higher order effects of different soils under the influence of the transmitted magnetic field which may include small variations in a ratio of received relatively high frequency resistive components compared to lower frequency resistive components the said linear combination output may be further processed to produce at a signal resulting in the said output indicator signal.

Owing to the smaller electronic linearity difficulties of receiving whilst the transmit signal is not varying, the best results at the time of writing are obtained when the transmitted magnetic field is controlled by the transmit electronics during at least a first period to transmit an approximately constant magnetic field which may be zero or finite in magnitude.

The receive electronics contains signal processing which may process the receive signal to produce and output indicator signal, wherein receive electronics signal processing includes synchronous demodulators, post synchronous demodulation filters and further processing to produce an indicator output signal. The said synchronous demodulators and post synchronous demodulation filters may be in analogue or in dsp form including analogue to digital converters or samplings averaged over sampling periods. The said synchronous demodulators are controlled by the said signal processing to demodulate and pass a product of a synchronous demodulation multiplication function multiplied by the receive signal to the said post synchronous demodulation filters during the first period. The integral or low-pass filtered, or average of the product of the synchronous demodulation multiplication function multiplied by the receive signal approximately results in zero for a component of the receive signal resulting from the presence of magnetic soils only within the influence of the said transmitted magnetic field and first inductor. The said receive signal resulting from the said magnetic soils only may include small variations in the ratio of the receive voltage signal during early periods within the first period compared to later periods within the first period, such that at least part of the 5 synchronous demodulation multiplication function multiplied by the receive signal includes at least one linear combination of in effect adding receive signal components containing at least relatively high frequency resistive components to receive signal components containing at least relatively low frequency resistive components and the resultant sum is subtracted from receive signal components containing at least relatively medium frequency resistive components to give a linear combination output. Coefficients of the linear combination are selected so that the linear combination output is approximately independent of signals from the said magnetic soils, including the said small variations in the ratio of the receive voltage signal during early periods within the first period compared to later periods within the first period.

The said integrated or average of the product of the said linear combination is selected to approximately equal zero from relatively slow varying magnetic fields such as those received when the coil is moved within the influence of static fields both from terrestrial and from magnetised magnetic soils to avoid signal contamination from these sources.

The said linear combination output may be further processed, such as further filtering for example, to produce a signal resulting in the said output indicator signal at an indicator output.

An example of the above could be the said transmit signal being a repetitive sequence of pulse induction waveforms, or pulse induction-like waveforms as described in Australian application 2006903737.

The magnetically permeable resistive component (R) of magnetic soils, or so called mineralised soils, increases with frequency and peaks, approximately, at a frequency corresponding to when an attenuation of the magnetically permeable real or reactive component X starts to decrease at a substantial rate (>=6 dB/octave). Near-pure magnetite rocks or pebbles have high X/R ratios where the decrease in X per frequency decade at typical metal detector frequencies is low, that is around 1% or lower. Typically near-pure magnetite rocks or pebbles have low ratios of the frequency dependent R component to the non-frequency dependent R component. Most goldfield soils and rocks contain a mixture of magnetic materials with lower X/R ratios than near pure-magnetite, and for these the decrease in X per frequency decade at typical metal detector frequencies is higher at typically several percent. Note that the ratio of R to a difference in X at two different frequencies, $\omega_h$ and $\omega_l$, is $R/(X_h - X_l) = \pi/(2\ln(\omega_h/\omega_l))$; see U.S. Pat. No. 4,942,360. This assumes that R is very much less frequency dependent than X, at least at typical metal detector frequencies. Most of the more nugget rich gold fields have a relatively random mixture of magnetite and other magnetic materials, where this mixture varies significantly within gold fields; so thus too does X/R. The ratio of the frequency dependent R component to the non-frequency dependent R component is correlated with R/X positively in gold field soils, but this correlation is poor mainly because of the random mixture of magnetite and other magnetic materials. The frequency dependent component of R is approximately proportional to log(F) where F is frequency, so the resistive component R of complex permeability is $(k1 + k2 \log(F))i$ where i is the usual square root of −1 and F is frequency, and k1 and k2 are material constants, $k2 \ll k1$ as the frequency dependent resistive component is relatively very small. This applies to typical metal detector frequencies, for example, at least over a range of frequencies from 1 kHz to 100 kHz.

In this respect, before explaining at least one embodiment of the invention in detail, it is to be understood that the invention is not limited in its application to the details of construction and to the arrangements of the components set forth in the following description or illustrated in the drawing. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings, which are incorporated in and constitute a part of this specification, illustrate certain embodiments of the invention, and together with the description, serve to explain the principles of the invention.

Those skilled in the art will appreciate that the conception upon which this disclosure is based may readily be utilised as a basis for designing other structures, methods, and systems for carrying out the several purposes of the present invention. It is important, therefore, to recognize that the claims should be regarded as including such equivalent constructions insofar as they do not depart from the spirit and scope of the present invention.

BRIEF DESCRIPTION OF THE DRAWINGS

For a better understanding of this disclosure it will now be described with respect to an exemplary embodiment which shall be described herein with the assistance of drawings wherein.

BEST MODE FOR CARRYING OUT THE INVENTION

Figure 1:
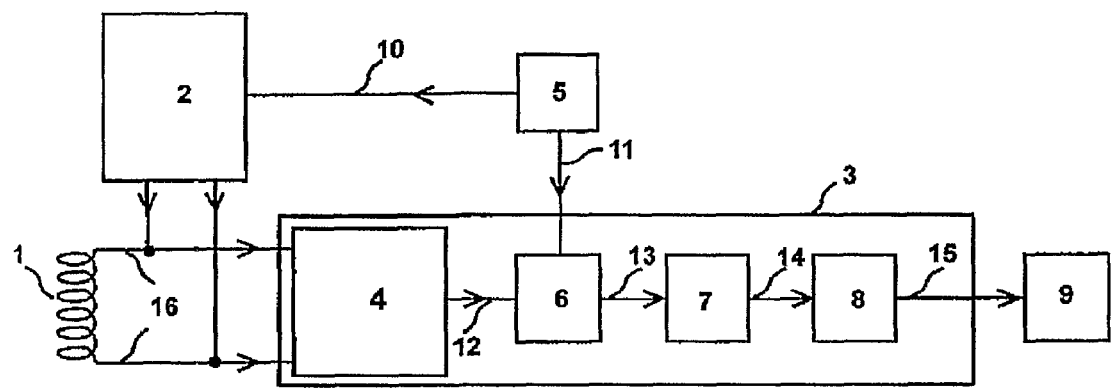
FIG. 1 shows an example of an exemplary electronic system capable of producing an appropriate transmit waveform and signal processing.

Referring now to FIG. 1, where an exemplary embodiment is illustrated. Specifically, FIG. 1 illustrates an inductor, a first inductor 1, acts as a transmit inductor to and a receive inductor to transmit and receive an alternating magnetic field. Transmit electronics 2 which may generate a transmit signal applied to the first inductor 1 to produce a transmitted magnetic field. The first inductor 1, receives a received magnetic field to produce a receive emf signal, the said first inductor is connected to receive electronics 3 which may include a transmit/receive switch (T/R) and may amplify and filter the receive emf signal in an amplifier (plus T/R switch) 4 to produce a receive signal at the output 12 of amplifier 4. The output 12 of amplifier 4 is fed to inputs of synchronous demodulators 6 which may be in conventional analogue switch or mixer form, or DSP form including A-Ds, or sampling electronics. The transmit electronics 2 and synchronous demodulators 6 are controlled by timing and control electronics 5. An output 13 of the synchronous demodulators 6 is fed to inputs of filters, or integrators or averagers 7. An output 14 of filters, or integrators or averagers 7 is fed to an input of further processing electronics 8, such as further filtering for example, to produce the indicator output signal at the output 15 of the further processing electronics 8. This may be in software or hardware. The output 15 is fed to an indicator output 9.

Figure 2:
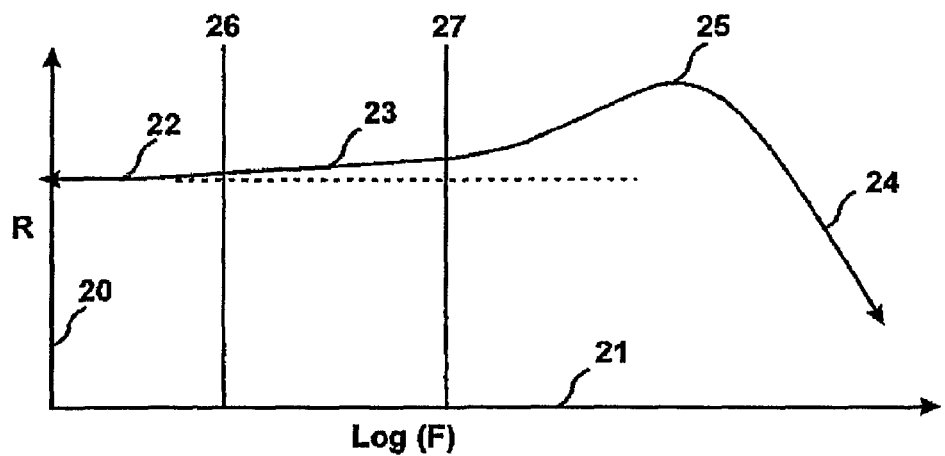
FIG. 2 shows an exaggerated frequency dependent resistive component of the complex magnetic permeability of magnetic soil or rock.

FIG. 2 shows a graph of a frequency-dependent resistive component of the complex permeability of mineralised soils or rocks, exaggerated for the sake of clarity. Axis 20 is the resistive component R, and axis 21 that of log(F) where F is frequency. Frequencies between 26 and 27 mark the effective operational frequency range of typical metal detectors, say 1 kHz to 100 kHz. Within this range, the resistive component of the complex permeability of mineralised soils or rocks is approximately equal to $R = k1 + k2 \log(F)$, where k1 and k2 are dependent upon the material. At low frequencies, the resistive component of the complex permeability of mineralised soils or rocks is constant 22. The resistive component peaks at 25, then decreases at higher frequencies 24, typically at >6 dB per octave over some frequency range.

Figure 3:
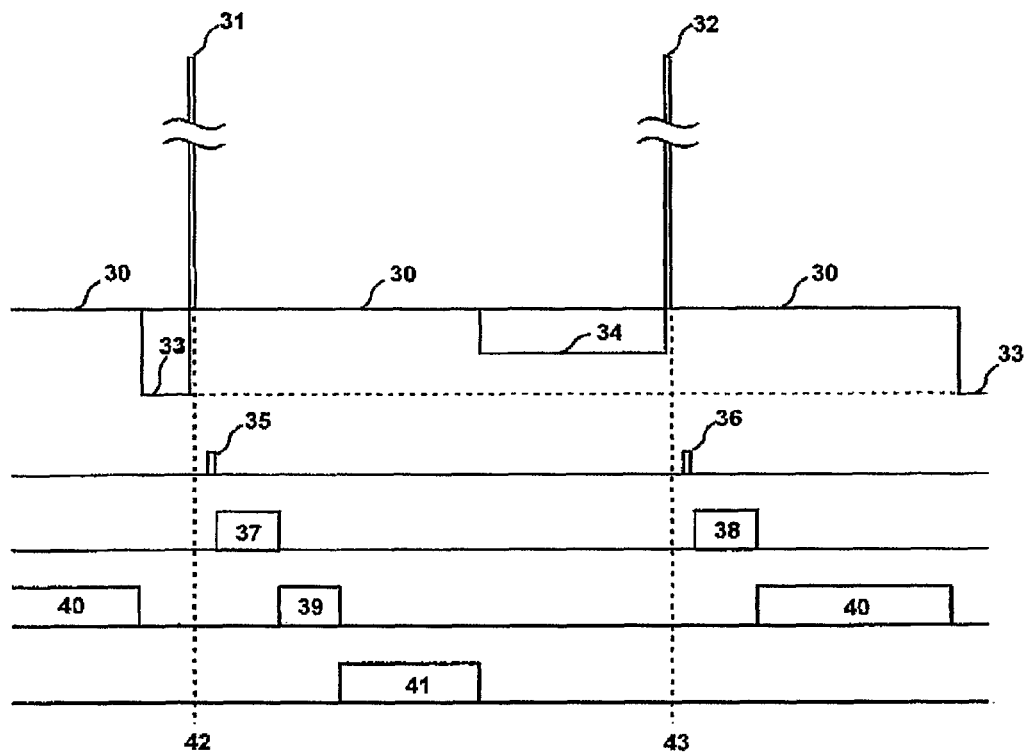
FIG. 3 shows an example of a multi-period multi-voltage pulse induction transmitting system as described in U.S. Pat. No. 6,653,838 with suitable synchronous demodulator timings suitable for this invention.

In FIG. 3, there is illustrated a repeating transmit signal consisting of 33, a transmit inductor current charging period with a third voltage applied to the transmit coil of relatively short duration, 31, a very short duration high back emf of a first voltage applied to the transmit coil, 30, zero transmitted magnetic field with a second voltage of zero reactive voltage applied to the transmit coil, a "first period,"

34, a transmit inductor current charging period with a fourth voltage applied to the transmit coil of relatively long duration, where the third voltage is at least double in magnitude the value of the fourth voltage, then another period 30 of zero transmitted magnetic field, another "first period,"

and then the sequence is repeated.

After the first voltage period 31, at time 42, a "first period" commences with zero transmit field. After a delay suitable for most soil conductive eddy currents and electronic transients to become insignificant, a short period 35 of synchronous demodulation occurs to sample all three frequency components, in particular the relatively high frequency resistive components. Thereafter a medium period 37 of synchronous demodulation occurs to sample the low and in particular the relatively medium frequency resistive components. Thereafter a period 39 of synchronous demodulation occurs to sample the low frequency resistive components. Similarly, after the first voltage period 32, at time 43, another (first) period commences with zero transmit field. After a delay suitable for most soil conductive eddy currents and electronic transients to become insignificant, a short period 36 of synchronous demodulation occurs to sample all three frequency resistive components, in particular the relatively high frequency resistive components. Thereafter a medium period 38 of synchronous demodulation occurs to sample the low and in particular the relatively medium frequency resistive components. Thereafter a relatively long period 40 of synchronous demodulation occurs to sample the low frequency resistive components. A static magnetic field or slowly varying magnetic field components balancing period 41 is required to null such fields, which may result from relative movement of the first inductor within the earth's static magnetic field or relative movement of the first inductor compared to statically magnetised soils. This period 41 contains low levels of low frequency resistive components. Contributions from periods 35, 36, 39 and 40 are added and contributions from periods 37, 38 and 41 are subtracted, and hence the synchronous demodulation multiplication function multiplied by the receive signal includes at least one linear combination of in effect adding receive signal components containing at least relatively high frequency resistive components to receive signal components containing at least relatively low frequency resistive components and the resultant sum is subtracted from receive signal components containing at least relatively medium frequency resistive components to give a linear combination output which is passed to low pass filters. To a first order effect, the output of the contributions from periods 35 added to 36, and subtracted from half the contributions of periods 37, 38 and 41 approximately null signals from the constant frequency independent resistive component of the complex permeability of mineralised soils or rocks (k1), and similarly so too is the output of the contributions from periods 39 added to 40, and subtracted from half the contributions of periods 37, 38 and 41 approximately null signals from the constant frequency independent resistive component of the complex permeability of mineralised soils or rocks (k1), and in total, the linear combination output is nulled to variations in frequency dependence of R.

Figure 4:
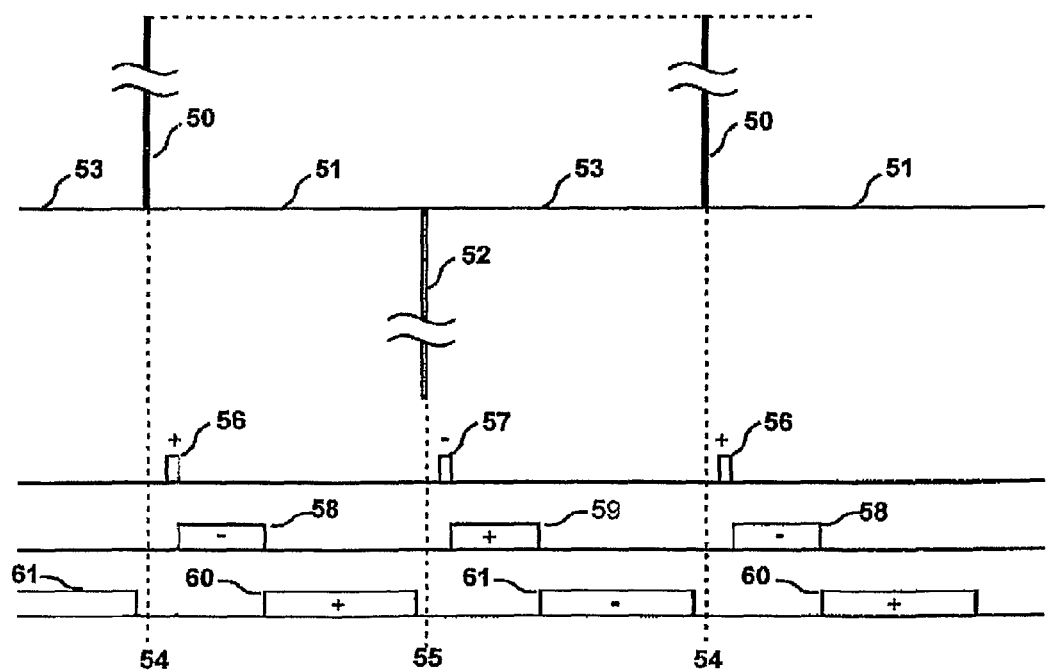
FIG. 4 shows an example of a transmit waveform described in Australian application 2006903737 (a bi-polar finite current constant zero reactive transmit voltage), with suitable synchronous demodulator timings suitable for this invention.

In FIG. 4, there is illustrated a reactive voltage transmit signal consisting of 51, zero reactive transmit volts but finite (positive) transmitted magnetic field (a "first period"), 52, a very short high back emf period, 53, another zero reactive transmit volts but finite (negative) transmitted magnetic field (another "first period"), 50, a very short high voltage back emf period.

Receive synchronous demodulation multiplication function multiplied by the receive signal passed to the said post synchronous demodulation filters during the "first periods" is similar to FIG. 3:

A "first period" commences at time 54. After a delay suitable for most soil conductive eddy currents and electronic transients to become insignificant, a short period 56 of synchronous demodulation occurs to sample all three frequency components, in particular the relatively high frequency resistive components. Thereafter a medium period 58 of synchronous demodulation occurs to sample the low and in particular the relatively medium frequency resistive components. Thereafter a relatively long period 60 of synchronous demodulation occurs to sample the low frequency resistive components. Similarly, another "first period" commences at time 55. After a delay suitable for most soil conductive eddy currents and electronic transients to become insignificant, a short period 57 of synchronous demodulation occurs to sample all three frequency components, in particular the relatively high frequency resistive components. Thereafter a medium period 59 of synchronous demodulation occurs to sample the low and in particular the relatively medium frequency resistive components. Thereafter a relatively long period 61 of synchronous demodulation occurs to sample the low frequency resistive components. Given the alternating sign of the transmit field, contributions from periods 56, 57, 60 and 61 are in effect added and contributions from periods 58 and 59 are subtracted, and hence the synchronous demodulation multiplication function multiplied by the receive signal includes at least one linear combination of in effect adding receive signal components containing at least relatively high frequency resistive components to receive signal components containing at least relatively low frequency resistive components and the resultant sum is subtracted from receive signal components containing at least relatively medium frequency resistive components to give a linear combination output which is passed to low pass fillers. To a first order effect, again taking the alternating transmit field sign into account, the output of the contributions from periods 56 added to 57, and subtracted from half the contributions of periods 58 and 59 approximately null signals from the constant frequency-independent resistive component of the complex permeability of mineralised soils or rocks (k1) and, similarly, so too is the output of the contributions from periods 60 added to 61, and subtracted from half the contributions of periods 58 and 59 approximately null signals from the constant frequency independent resistive component of the complex permeability of mineralised soils or rocks (k1) and, in total, the linear combination is nulled to variations in the frequency dependence of R.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. A method for detecting a target in a soil including the steps of:
   generating a transmit signal, the transmit signal including at least three different frequency components, a relatively high frequency component, a relatively medium frequency component and a relatively low frequency component;
   generating a transmitted magnetic field, based on the transmit signal, for transmission into the soil;
   receiving a received magnetic field;
   producing a receive signal induced by the received magnetic field, the receive signal including relatively high frequency components, relatively medium frequency components, and relatively low frequency components; and
   processing the receive signal, the processing including selecting coefficients for, in effect, linearly combining the relatively high frequency components, the relatively low frequency components and the relatively medium frequency components of the receive signal to produce an indicator output signal, the indicator output signal including a signal indicative of the presence of the target in the soil, and wherein the coefficients are selected such that the indicator output signal is approximately independent of log-linear frequency-dependent resistive signal components and log-uniform resistive signal components from the soil.

2. A method according to claim 1, wherein the coefficients are selected to, in effect, summing the relatively high frequency components of the receive signal and the relatively low frequency components of the receive signal, and subtracting the result of the summation from the relatively medium frequency components of the receive signal.

3. A method according to claim 2, wherein the coefficients are selected such that the indicator output signal is further approximately independent of higher order effects of the soil under the influence of the transmitted magnetic field, the higher order effects include small variations in a ratio of relatively high frequency resistive components of the signals from soils and relatively medium frequency resistive components of the signals from soils, and small variations in a ratio of relatively medium frequency resistive components of the signals from soils and relatively low frequency resistive components of the signals from soils.

4. A method according to claim 1, wherein the coefficients are selected such that the indicator output signal is further approximately independent of higher order effects of the soil under the influence of the transmitted magnetic field, the higher order effects include small variations in a ratio of relatively high frequency resistive components of the signals from soils and relatively medium frequency resistive components of the signals from soils, and small variations in a ratio of relatively medium frequency resistive components of the signals from soils and relatively low frequency resistive components of the signals from soils.

5. A method according to claim 1, wherein the processing further includes, prior to the linear combination, sampling the receive signal for the relatively high, medium and low frequency components.

6. A method according to claim 1, wherein the processing further includes, prior to the linear combination, synchronously demodulating the receive signal with a synchronous demodulation multiplication function to sample the receive signal for the relatively high, medium and low frequency components.

7. A method according to claim 6, wherein the integral or average of the product of the synchronous demodulation multiplication function and the receive signal is approximately zero in the absence of the target.

8. A method according to claim 1, wherein the transmit signal is a repeating transmit signal.

9. A method according to claim 8, wherein the repeating transmit signal includes a high voltage period followed by a receive period.

10. A method according to claim 9, wherein the transmitted magnetic field during the receive period is approximately constantly zero or approximately at a constant finite magnitude.

11. A method according to claim 1, wherein the soil includes magnetic materials with a complex magnetic permeability, a resistive component of the complex magnetic permeability including a first component which is approximately independent of frequency, and a second component which increases with frequency, at least over the range of frequencies from 1 kHz up to 100 kHz.

12. A method according to claim 11, wherein the resistive components are proportional to k1+k2 log(F) at least over the range of frequencies from 1 kHz up to 100 kHz, where k1 and k2 are constants and k2/k1 is material dependent, F is frequency, and wherein the indicator output signal is independent of materials with said resistive components.

13. A metal detector configurable to perform the steps of:
generating a transmit signal, the transmit signal including at least three different frequency components, a relatively high frequency component, a relatively medium frequency component and a relatively low frequency component;
generating a transmitted magnetic field, based on the transmit signal, for transmission into the soil;
receiving a received magnetic field;
producing a receive signal induced by the received magnetic field, the receive signal including relatively high frequency components, relatively medium frequency components, and relatively low frequency components; and
processing the receive signal, the processing including selecting coefficients for, in effect, linearly combining the relatively high frequency components, the relatively low frequency components and the relatively medium frequency components of the receive signal to produce an indicator output signal, the indicator output signal including a signal indicative of the presence of the target in the soil, and wherein the coefficients are selected such that the indicator output signal is approximately independent of log-linear frequency-dependent resistive signal components and log-uniform resistive signal components from the soil.

14. A metal detector according to claim 13, wherein the coefficients are selected to, in effect, summing the relatively high frequency components of the receive signal and the relatively low frequency components of the receive signal, and subtracting the result of the summation from the relatively medium frequency components of the receive signal.

15. A metal detector according to claim 14, wherein the coefficients are selected such that the indicator output signal is further approximately independent of higher order effects of the soil under the influence of the transmitted magnetic field, the higher order effects include small variations in a ratio of relatively high frequency resistive components of the signals from soils and relatively medium frequency resistive components of the signals from soils, and small variations in a ratio of relatively medium frequency resistive components of the signals from soils and relatively low frequency resistive components of the signals from soils.

16. A metal detector according to claim 13, wherein the coefficients are selected such that the indicator output signal is further approximately independent of higher order effects of the soil under the influence of the transmitted magnetic field, the higher order effects include small variations in a ratio of relatively high frequency resistive components of the signals from soils and relatively medium frequency resistive components of the signals from soils, and small variations in a ratio of relatively medium frequency resistive components of the signals from soils and relatively low frequency resistive components of the signals from soils.

17. A processor adapted to execute instructions to perform the steps of:
processing a receive signal, the processing including selecting coefficients for, in effect, linearly combining relatively high frequency components, relatively low frequency components and relatively medium frequency components of the receive signal to produce an indicator output signal, the indicator output signal including a signal indicative of the presence of a target in a soil, and wherein the coefficients are selected such that the indicator output signal is approximately independent of log-linear frequency-dependent resistive signal components and log-uniform resistive signal components from the soil.

18. A processor according to claim 17, wherein the coefficients are selected to, in effect, summing the relatively high frequency components of the receive signal and the relatively low frequency components of the receive signal, and subtracting the result of the summation from the relatively medium frequency components of the receive signal.

19. A processor according to claim 18, wherein the coefficients are selected such that the indicator output signal is further approximately independent of higher order effects of the soil under the influence of the transmitted magnetic field, the higher order effects include small variations in a ratio of relatively high frequency resistive components of the signals from soils and relatively medium frequency resistive components of the signals from soils, and small variations in a ratio of relatively medium frequency resistive components of the signals from soils and relatively low frequency resistive components of the signals from soils.

20. A processor according to claim 17, wherein the coefficients are selected such that the indicator output signal is further approximately independent of higher order effects of the soil under the influence of the transmitted magnetic field, the higher order effects include small variations in a ratio of relatively high frequency resistive components of the signals from soils and relatively medium frequency resistive components of the signals from soils, and small variations in a ratio of relatively medium frequency resistive components of the signals from soils and relatively low frequency resistive components of the signals from soils.

* * * * *